US011930347B2

(12) United States Patent
Chen et al.

(10) Patent No.: US 11,930,347 B2
(45) Date of Patent: Mar. 12, 2024

(54) ADAPTIVE LOUDNESS NORMALIZATION FOR AUDIO OBJECT CLUSTERING

(71) Applicant: Dolby Laboratories Licensing Corporation, San Francisco, CA (US)

(72) Inventors: Lianwu Chen, Beijing (CN); Lie Lu, Dublin, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 291 days.

(21) Appl. No.: 17/427,665

(22) PCT Filed: Feb. 12, 2020

(86) PCT No.: PCT/US2020/017953
§ 371 (c)(1),
(2) Date: Aug. 2, 2021

(87) PCT Pub. No.: WO2020/167966
PCT Pub. Date: Aug. 20, 2020

(65) Prior Publication Data

US 2022/0159395 A1 May 19, 2022

Related U.S. Application Data

(60) Provisional application No. 62/814,718, filed on Mar. 6, 2019.

(30) Foreign Application Priority Data

Feb. 13, 2019 (WO) ................ PCT/CN2019/074915
Mar. 11, 2019 (EP) .................................... 19161889

(51) Int. Cl.
*H04S 7/00* (2006.01)

(52) U.S. Cl.
CPC ............ *H04S 7/30* (2013.01); *H04S 2400/13* (2013.01)

(58) Field of Classification Search
None
See application file for complete search history.

(56) References Cited

U.S. PATENT DOCUMENTS 8,143,620 B1 3/2012 Malinowski
8,504,181 B2 8/2013 Seefeldt
(Continued)

FOREIGN PATENT DOCUMENTS

CN 103199881 B 7/2015
EP WO-2018017394 A1 * 1/2018 .............. H04R 5/02
(Continued)

OTHER PUBLICATIONS

Bleidt, R. et al."Object-Based Audio: Opportunities for Improved Listening Experience and Increased Listener Involvement" SMPTE Motion Imaging Journal, Jul./Aug. 2015.
(Continued)

*Primary Examiner* — Duc Nguyen
*Assistant Examiner* — Assad Mohammed

(57) ABSTRACT

A method of processing audio content including a plurality of audio elements comprises: clustering the plurality of audio elements into a plurality of clusters of audio elements; and for a cluster among the plurality of clusters: for each audio element in the cluster, determining a measure of energy that the audio element contributes to the cluster; for at least one audio element in the cluster, determining a
(Continued)

compensation gain based at least in part on the measures of energy for the audio elements in the cluster; and applying the compensation gain to the at least one audio element in the cluster.

24 Claims, 5 Drawing Sheets

(56) References Cited

U.S. PATENT DOCUMENTS

| | | | | |
|---|---|---|---|---|
| 9,479,886 | B2 | 10/2016 | Xiang | |
| 9,530,421 | B2 | 12/2016 | Jot | |
| 9,559,656 | B2 | 1/2017 | Tracey | |
| 9,653,084 | B2 | 5/2017 | Borsum | |
| 9,756,445 | B2 | 9/2017 | Wang | |
| 9,805,725 | B2 | 10/2017 | Crockett | |
| 9,820,044 | B2 | 11/2017 | Yang | |
| 2011/0013790 | A1* | 1/2011 | Hilpert | G10L 19/008 381/1 |
| 2013/0272543 | A1* | 10/2013 | Tracey | H03G 5/005 381/107 |
| 2014/0341394 | A1* | 11/2014 | Croft, III | H04R 1/2819 381/102 |
| 2015/0332680 | A1 | 11/2015 | Crockett | |
| 2016/0019898 | A1* | 1/2016 | Schreiner | G10L 21/0232 704/500 |
| 2016/0192105 | A1* | 6/2016 | Breebaart | H04S 7/308 381/303 |
| 2016/0212559 | A1 | 7/2016 | Mateos Sole | |
| 2017/0171687 | A1 | 6/2017 | Breebaart | |
| 2018/0197554 | A1* | 7/2018 | Paulus | G10L 19/265 |
| 2018/0227691 | A1 | 8/2018 | Chen | |
| 2019/0297447 | A1* | 9/2019 | Seldess | H04R 3/14 |

FOREIGN PATENT DOCUMENTS

| | | | | |
|---|---|---|---|---|
| WO | 2018017394 | A1 | 1/2018 | |
| WO | WO-2018017394 | A1 * | 1/2018 | H04R 5/02 |

OTHER PUBLICATIONS

Herre, J. et al.“MPEG-H Audio—The New Standard for Universal Spatial / 3D Audio Coding” JAES vol. 62, issue 12, Jan. 5, 2015.

Kamado, N. et al.“Object-Based Stereo Up-Mixer for Wave Field Synthesis Based On Spatial Information Clustering” 20th European Signal Processing Conference, Bucharest, Romania, Aug. 27-31, 2012, pp. 594-598.

Wolters, M. et al.“Loudness Normalization In The Age Of Portable Media Players” AES presented at the 128th Convention, May 1, 2010, London, UK, pp. 1-17.

Woodcock, J. et al.“Elicitation of Expert Knowledge to Inform Object-Based Audio Rendering to Different Systems” J. Audio Eng. Soc. vol. 66, No. 1/2, pp. 44-59, Jan./Feb. 2018.

* cited by examiner

ADAPTIVE LOUDNESS NORMALIZATION FOR AUDIO OBJECT CLUSTERING

CROSS-REFERENCE TO RELATED APPLICATIONS

This application claims the benefit of priority from U.S. Provisional Application No. 62/814,718 filed 6 Mar. 2019 and European Patent Application No. 19161889.1 filed Mar. 11, 2019 and PCT/CN2019/074915 filed Feb. 13, 2019, which are hereby incorporated by reference in their entirety.

TECHNICAL FIELD

The present disclosure relates to methods and apparatus for processing audio content including a plurality of audio elements, and particularly to adaptive loudness normalization for such audio content.

BACKGROUND

The new consumer Dolby® Atmos® cinema system has introduced a new audio format that includes both audio beds (channels) and audio objects. Audio beds refer to audio channels that are meant to be reproduced in predefined, fixed speaker locations, while audio objects refer to individual audio elements that may exist for a defined duration in time but also have spatial information (e.g., as part of metadata) describing the position, velocity, and size of each object. During transmission, beds and objects can be sent separately and then used by a spatial reproduction system to recreate the artistic intent using a variable number of speakers in known physical locations. In some soundtracks, there may be up to 7, 9 or even 11 bed channels. Additionally, based on the capabilities of an authoring system there may be tens or even hundreds of individual audio objects that are combined during rendering to create a spatially diverse and immersive audio experience.

The large number of audio signals present in such object-based content poses new challenges for the coding and distribution of such content. In some distribution and transmission systems, there may be large enough available bandwidth to transmit all audio beds and objects with little or no audio compression. In some cases, however, such as Bluray® disc, broadcast (cable, satellite and terrestrial), mobile (3G and 4G) and over the top (OTT, or internet) distribution there may be significant limitations on the available bandwidth to digitally transmit all the beds and objects. While audio coding methods (lossy or lossless) may be applied to the audio to reduce the required bandwidth, audio coding may not be sufficient to reduce the bandwidth required to transmit the audio, particularly over very limited networks such as mobile 3G and 4G networks.

To address this issue, the number of input objects and beds can be reduced into a smaller set of output objects/beds by means of clustering. In general, the audio clustering process is comprised of two major stages, 1) determining the cluster positions and 2) determining the gains for rendering objects into output clusters, aiming at minimizing the overall spatial distortion or preserving the overall spatial perception based on spatial masking assumptions.

Clustering may work well in general when objects/beds are clustered to a decent number of clusters (e.g., 11). However, this is not generally true for the use case of 'cascade audio object clustering'. This use case is schematically illustrated in FIG. 1. Object-based audio content 110 (e.g., an Atmos printmaster) is clustered at a first clustering stage 120 to a first number (e.g., 11) of (intermediate or initial) clusters. Then, the obtained clusters are further clustered to a smaller number of (final or output) clusters (e.g., 5) at a second clustering stage 130. In this use case, a loudness boost can be observed when the final clusters (e.g., 5) are rendered to a given speaker layout (e.g., 5.1.2) at processing stage 140, compared to directly rendering the initial clusters (e.g., 11) to the same speaker layout. This loudness boost clearly is undesirable.

A similar (though less standing out) loudness boost may arise in the use case in which the objects/beds are directly clustered to a number of clusters (e.g., 5) and then rendered to a speaker layout. This use case is illustrated in FIG. 2. Object-based audio content 210 is clustered to a number of clusters (e.g., 5) at clustering stage 220 and then rendered to the speaker layout at processing stage 230.

Thus, there is a need for improved processing of audio content including a plurality of audio elements. There is particular need for improved processing of audio content including a plurality of audio elements that avoids loudness boosts when rendering clustered versions of the audio content to a speaker layout. In general, there is a need for improved control of loudness for such audio content.

SUMMARY

The present invention provides a method of processing audio content including a plurality of audio elements and a corresponding apparatus, having the features of the respective independent claims.

An aspect of the disclosure relates to a method of processing audio content including a plurality of audio elements. The audio elements may be localized audio elements and may include, for example, audio objects, audio beds (bed channels), and/or (intermediate) clusters of audio objects. The method may include clustering the plurality of audio elements into a plurality of clusters (e.g., final clusters or output clusters) of audio elements. Each of the clusters may include spatially close audio elements. The number of clusters may be smaller than the number of audio elements. The processing may be applied to each cluster. Thus, the method may further include, for a cluster among the plurality of clusters: for each audio element in the cluster, determining a measure of energy that the audio element contributes to the cluster. The method may further include, for the cluster among the plurality of clusters: for at least one audio element in the cluster, determining a compensation gain based at least in part on the measures of energy for the audio elements in the cluster. The method may yet further include, for the cluster among the plurality of clusters: applying the compensation gain to the at least one audio element in the cluster. Applying the compensation gain to the at least one audio element may reduce a difference in loudness between the at least one audio object when rendered to a set (layout) of loudspeakers as part(s) of the clusters and the at least one audio object when rendered directly to the set of loudspeakers. The method may further include rendering the plurality of clusters of audio elements to a loudspeaker layout.

Determining compensation gains in the proposed manner can greatly alleviate the loudness boost. That is, a loudness of each perceivable audio object or bed channel that results from rendering the clusters to a target speaker layout may be brought substantially closer to a respective loudness that would result if the audio objects or bed channels were directly rendered to the target speaker layout.

In some embodiments, the measure of energy that an audio element contributes to the cluster c may be given by $E_{oc}=g_{oc}^2E_o$, where $E_o$ is the energy of the audio element and $g_{oc}$ is the element-to-cluster gain for the audio element o (e.g., the gain with which this audio element is rendered to the cluster).

In some embodiments, the method may further include, for the cluster among the plurality of clusters: determining a spectrum of the cluster based on respective spectra that the audio elements contribute to the cluster. The method may yet further include, for the cluster among the plurality of clusters: determining, as at least a part of the compensation gain for each audio element in the cluster, an overall compensation gain for the cluster based at least in part on the measures of energy for the audio elements in the cluster and the spectrum of the cluster.

In some embodiments, the method may further include, for the cluster among the plurality of clusters: determining a first measure of energy of the cluster as a sum of the measures of energy that the audio elements in the cluster contribute to the cluster. The method may further include, for the cluster among the plurality of clusters: determining a spectrum of the cluster based on respective spectra that the audio elements contribute to the cluster. The method may further include, for the cluster among the plurality of clusters: determining a second measure of energy of the cluster based on the spectrum of the cluster. The first measure of energy may be referred to as the total energy (total element energy (e.g., total object energy) or expected energy) of the cluster. The second measure of energy may be referred to as the actual energy of the cluster. The method may yet further include, for the cluster among the plurality of clusters: determining, as at least a part of the compensation gain for each audio element in the cluster, an overall compensation gain for the cluster based on the first measure of energy and the second measure of energy.

Applying the overall compensation gain to the audio elements in the cluster will reduce a difference between the estimated energy and the actual energy of the cluster, thereby alleviating the loudness boost and improving perceived sound quality.

In some embodiments, the first measure of energy for the cluster may be given by $E_{tot\_o}=\Sigma_o E_{oc}$ and/or the second measure of energy may be given by $E_c=X_c{}^*X_c$, where index o indicates a respective audio element in the cluster, with $X_c=\Sigma_o g_{oc}X_o$ being the spectrum of the cluster, $X_o$ being the spectrum of the respective audio element, and ■* indicating the complex conjugate of ■.

In some embodiments, the overall compensation gain of the cluster may be determined as the square root of a ratio of the first measure of energy and the second measure of energy. For example, the overall compensation gain of the cluster may be given by $$g1_c=\sqrt{\frac{E_{tot\_o}}{E_c}}.$$

Applying this gain may yield a total audio element gain (total audio element-to-cluster gain) $g_{oc}'=g_{oc}\cdot g1_c$.

In some embodiments, the method may include, for a given audio element in the cluster among the plurality of clusters: determining measures of correlation between the given audio element and any of the plurality of audio elements. The method may further include, for the given audio element in the cluster among the plurality of clusters: determining, as at least a part of the compensation gain for the given audio element, an individual compensation gain of the given audio element based at least in part on the measures of energy for the audio elements in the cluster and the measures of correlation between the given audio element and any of the plurality of audio elements.

In some embodiments, the method may include, for a given audio element in the cluster among the plurality of clusters: determining measures of correlation between the given audio element and any of the plurality of audio elements. The method may further include, for the given audio element in the cluster among the plurality of clusters: determining a third measure of energy for the given audio element as a weighted sum of the measures of energy that the audio elements contribute to the cluster. The weights for the measures of energy may be based on the respective measures of correlation between the respective audio elements and the given audio element. The method may further include, for the given audio element in the cluster among the plurality of clusters: determining a fourth measure of energy for the given audio element as a weighted sum, over any audio elements among the plurality of audio elements apart from the given audio element, of geometric means of the measure of energy that the given audio element contributes to the cluster and respective measures of energy that the audio elements among the plurality of audio elements apart from the given audio element contribute to the cluster. The weights for the geometric means may be based on the respective measures of correlation between the respective audio elements and the given audio element. The method may yet further include, for the given audio element in the cluster among the plurality of clusters: determining, as at least a part of the compensation gain for the given audio element, an individual compensation gain of the given audio element based on the third measure of energy and the fourth measure of energy.

Applying the individual compensation gains to the audio elements in the clusters will attenuate the audio elements in dependence on their correlations with other audio elements. The general idea is the following. If an audio element is highly correlated to other audio elements, it may introduce higher loudness boost and thus applying a smaller gain may be more appropriate. Since highly correlated audio elements strongly contribute to the loudness boost, this allows for a targeted attenuation of audio elements, thereby further alleviating the loudness boost and improving perceived sound quality.

In some embodiments, the measure of correlation between the given audio element and any of the plurality of audio elements may be given by $$r_{ou}=\frac{\mathrm{Re}(X_o^*X_u)}{\sqrt{E_oE_u}},$$

where indices o and u indicate the given audio element and the one of the plurality of audio elements, respectively, with $X_o$ being the spectrum of the given audio element, $X_u$ being the spectrum of the one of the plurality of audio elements, $E_o$ being the energy of the given audio element, and $E_u$ being the energy of the one of the plurality of audio elements. In addition or alternatively, the third measure of energy may be given by $a_{oc}=\Sigma_u|r_{ou}|E_{uc}$. In addition or alternatively, the fourth measure of energy may be given by $b_{oc}=\Sigma_{u\neq o}r_{ou}\sqrt{E_{oc}E_{uc}}$.

In some embodiments, the individual compensation gain $g1_{oc}$ may be given by $$g1_{oc} = \frac{a_{oc}}{a_{oc} + b_{oc}}.$$

That is, the individual compensation gain for the given audio element may be determined as a ratio of the third measure of energy and the sum of the third and fourth measures of energy for the given audio element.

In some embodiments, the method may further include, for the cluster among the plurality of clusters: determining a respective individual compensation gain for each audio element in the cluster. The method may further include, for the cluster among the plurality of clusters: applying respective individual compensation gains to the audio elements in the cluster to obtain individually compensated audio elements. The method may further include, for the cluster among the plurality of clusters: determining a spectrum of the cluster based on respective spectra that the individually compensated audio elements contribute to the cluster. The method may yet further include, for the cluster among the plurality of clusters: determining, as at least a part of the compensation gain for each individually compensated audio element in the cluster, an overall compensation gain for the cluster based at least in part on the measures of energy for the individually compensated audio elements in the cluster and the spectrum of the cluster.

In some embodiments, the method may include, for the cluster among the plurality of clusters: determining a respective individual compensation gain for each audio element in the cluster. The method may further include, for the cluster among the plurality of clusters: applying respective individual compensation gains to the audio elements in the cluster to obtain individually compensated audio elements. The method may further include, for the cluster among the plurality of clusters: determining a fifth measure of energy of the cluster as a sum of the measures of energy that the individually compensated audio elements in the cluster contribute to the cluster. The method may further include, for the cluster among the plurality of clusters: determining a spectrum of the cluster based on respective spectra that the individually compensated audio elements contribute to the cluster. The method may further include, for the cluster among the plurality of clusters: determining a sixth measure of energy of the cluster based on the spectrum of the cluster. As such, the fifth measure of energy may correspond to the first measure of energy and the sixth measure of energy may correspond to the second measure of energy, with the difference that now the individually compensated audio elements are considered. The method may yet further include, for the cluster among the plurality of clusters: determining, as at least a part of the compensation gain for each individually compensated audio element in the cluster, an overall compensation gain of the cluster based on the fifth measure of energy and the sixth measure of energy (e.g., as the square root of their ratio, in the same manner as for the first and second measures of energy).

By determining such overall compensation gains after individual compensation gains have been applied, the loudness boost is further alleviated and perceived sound quality is further improved.

In some embodiments, the method may further include, for a loudspeaker to which at least one of the clusters is rendered: determining respective measures of energy that the audio elements contribute to an output (e.g., output signal) of the loudspeaker. The method may further include, for the loudspeaker to which at least one of the clusters is rendered: determining a spectrum of the output of the loudspeaker based on respective spectra that the audio elements contribute to the output of the loudspeaker. The method may yet further include, for the loudspeaker to which at least one of the clusters is rendered: determining an overall compensation gain of the loudspeaker based at least in part on the measures of energy that the audio elements contribute to the output of the loudspeaker and the spectrum of the output of the loudspeaker.

In some embodiments, the method may further include, for a loudspeaker to which at least one of the clusters is rendered: determining respective measures of energy that the audio elements contribute to an output (e.g., output signal) of the loudspeaker. The audio elements may be original audio elements or individually compensated audio elements. The method may further include, for the loudspeaker to which at least one of the clusters is rendered: determining a seventh measure of energy of the output of the loudspeaker based on the respective measures of energy that the audio elements contribute to the output of the loudspeaker. The method may further include, for the loudspeaker to which at least one of the clusters is rendered: determining a spectrum of the output of the loudspeaker based on respective spectra that the audio elements contribute to the output of the loudspeaker. The method may further include, for the loudspeaker to which at least one of the clusters is rendered: determining an eighth measure of energy of the output of the loudspeaker based on the spectrum of the output of the loudspeaker. The method may yet further include, for the loudspeaker to which at least one of the clusters is rendered: determining an overall compensation gain of the loudspeaker based on the seventh measure of energy and the eighth measure of energy.

By determining such speaker-dependent compensation gains (possibly after overall and/or individual compensation gains have been applied), the loudness boost is further alleviated and perceived sound quality is further improved.

In some embodiments, the seventh measure of energy may be given by $E_{elem \rightarrow spk} = E_{o=1}^{N} g_{os}^{2} E_o$, with the element-to-speaker gain $g_{os}$ for audio element o among the plurality of audio elements and the loudspeaker s. In addition or alternatively, the spectrum of the output of the loudspeaker may be given by $X_{cls \rightarrow spk} = \Sigma_c \Sigma_o g_{cs} g_{oc} X_o$, with index c indicating the clusters, $X_o$ indicating the spectrum of a given audio element o, $g_{cs}$ being the cluster-to-speaker gain for cluster c and the loudspeaker s, and $g_{oc}$ being the element-to-cluster gain for cluster c and audio element o in the cluster. In addition or alternatively, the eighth measure of energy may be given by $E_{cls \rightarrow spk} = X_{cls \rightarrow spk} {}^{*} X_{cls \rightarrow spk}$.

In some embodiments, the overall compensation gain of the loudspeaker may be determined as the square root of a ratio of the seventh measure of energy and the eighth measure of energy. For example, the overall compensation gain $g2_{oc}$ of the loudspeaker may be given by $$g2_{oc} = \sqrt{\frac{E_{elem \rightarrow spk}}{E_{cls \rightarrow spk}}}.$$

In some embodiments, the compensation gain may be determined for each frame or each group of frames of the audio content. That is, the compensation gain may be dynamically determined.

In some embodiments, clustering the plurality of audio elements into the plurality of clusters may comprise clustering the plurality of audio elements into a plurality of intermediate clusters (stage-1 clustering). Clustering the plurality of audio elements into the plurality of clusters may further comprise clustering the plurality of intermediate clusters into the plurality of clusters (stage-2 clustering). This clustering may be referred to as cascade audio object clustering.

In some embodiments, the method may further include applying a dynamic range compressor or limiter to the determined compensation gain before applying the compensation gain to a respective audio element.

In some embodiments, the method may further include setting the compensation gain to unity depending on whether a difference between an expected (e.g., total) energy and an actual energy of the respective cluster is smaller than a predetermined threshold for the difference. For example, the compensation gain may be set to unity (i.e., no additional compensation) if the difference is smaller than the predetermined threshold.

In some embodiments, the method may further include increasing a decorrelation between audio elements among the plurality of audio elements that have a spatial size in excess of a predetermined threshold for the size. Additional decorrelation may be particularly applied to internal bed channels.

In some embodiments, the compensation gain may be determined in each of a plurality of frequency subbands.

In some embodiments, the measure of energy may be a measure of loudness. That is, the compensation gain determination may be performed in the loudness domain.

By these measures, determination of the compensation gain can be further refined.

Another aspect of the disclosure relates to an apparatus comprising a processor and a memory coupled to the processor and storing instructions for execution by the processor. The processor may be configured to perform the method steps of the method according to the preceding aspect and any of its embodiments.

Another aspect of the disclosure relates to a computer program including instructions for causing a processor that carries out the instructions to perform the method according to the above first aspect and any of its embodiments.

Another aspect of the disclosure relates to a computer-readable storage medium storing the computer program according to the foregoing aspect.

While reference is made in this disclosure to audio elements in a given cluster, it is understood that a given audio element can be rendered to more than one cluster, in accordance with respective element-to-cluster gains. In this sense, an audio element in a given cluster may be understood to be that part of the audio element that is rendered to the given cluster. Applying a certain compensation gain to one part of an audio element does not exclude that a different compensation gain is applied to another part of the audio element.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates a first use case for embodiments of the disclosure, FIG. 2 schematically illustrates a second use case for embodiments of the disclosure.

DETAILED DESCRIPTION

As indicated above, identical or like reference numbers in the disclosure indicate identical or like elements, and repeated description thereof may be omitted for reasons of conciseness.

As has been found, the loudness boost is mainly caused by the objects with size (and possibly zone mask), which were first pre-baked to an internal speaker layout (e.g., 7.1.4) before clustering to clusters. When these internal beds are grouped to dynamic clusters, or the clusters obtained from a first stage clustering process are further grouped to a smaller number of clusters in a second stage, the signals from the same object, which were distributed to different beds or clusters, were further rendered to a same cluster and acoustically summed up in the subsequent clustering process and thus introduced loudness boost.

In general, the loudness boost may be content-dependent, cluster-dependent, and speaker-layout dependent. Therefore, it is not feasible to use a pre-defined gain for each object/cluster to compensate for the loudness boost. This disclosure presents an adaptive loudness normalization method to address this problem.

As noted above, processing according to embodiments of this disclosure is applicable to at least two use cases: cascade clustering of object-based content followed by rendering to a loudspeaker layout (first use case) and direct rendering of clustered audio content to a loudspeaker layout (especially if there is a limited number of clusters; second use case). To jointly address these use cases, the term audio element will be used throughout the disclosure to mean a localized audio element, such as an audio object, an audio bed (bed channel), and/or an (intermediate) cluster of audio objects or audio beds, for example. Moreover, unless indicated otherwise, clusters shall mean those clusters that are intended for rendering. Clusters that are themselves subjected to further clustering may be referred to as audio elements or intermediate clusters. Using this terminology, cascade clustering may be said to relate to clustering a plurality of audio elements by first clustering the plurality of audio elements into a plurality of intermediate clusters, and subsequently clustering the plurality of intermediate clusters into the plurality of clusters.

Broadly speaking, processing according to embodiments of the disclosure involves analyzing the expected energy and actual energy of each cluster, computing a corresponding compensation gain g, and applying the computed gain on top of any original element-to-cluster gains (e.g., object-to-cluster gains) $g_{oc}$ for each audio element (e.g., audio object, audio bed, or intermediate cluster) o in a given cluster c.

Figure 1:
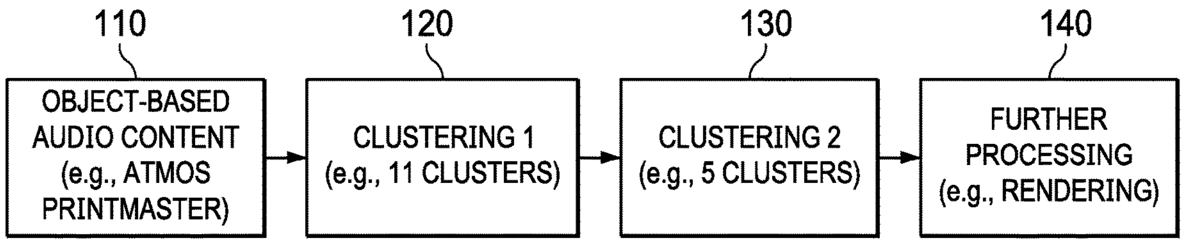
Figure 2:
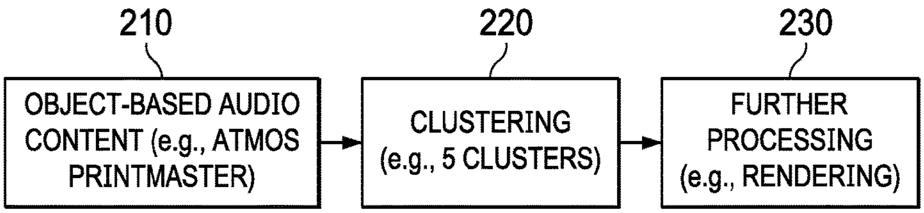

Depending on different use cases, not all audio elements need the compensation gains. In line with the above considerations, in some embodiments compensation gains may be applied to the intermediate clusters in cascade clustering (first use case, FIG. 1) and to internal beds with predetermined (pre-baked) object size in the case of single stage clustering (second use case, FIG. 2). However, the field of application of embodiments of the present disclosure is not limited to these examples and compensation gains may be applied to other entities as well.

Figure 3:
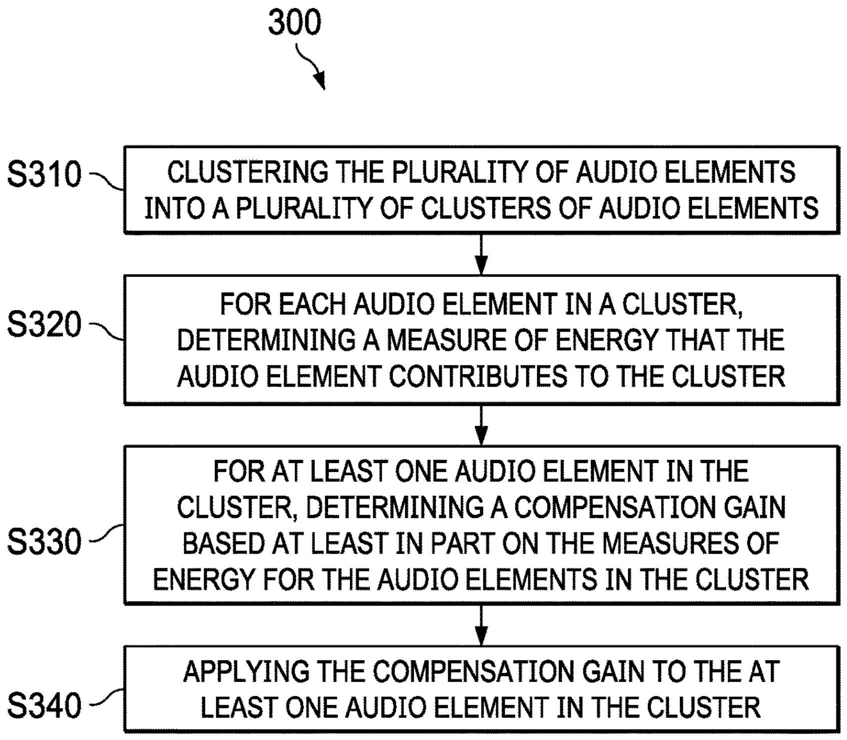
FIG. 3 is a flowchart illustrating an example of a method of processing audio content according to embodiments of the disclosure.

A first example of a method 300 of processing audio content including a plurality of audio elements is illustrated in FIG. 3. Again, the audio elements may relate to audio objects or audio beds (e.g., in the second use case), or to (intermediate) clusters of audio objects or audio beds (e.g., in the first use case).

At step S310, the plurality of audio elements are clustered into a plurality of clusters of audio elements. Here, each of the clusters may include spatially close audio elements. The number of clusters may be smaller than the number of audio elements.

Steps S320 to S340 are subsequently performed for (at least) a cluster among the plurality of clusters. Needless to say, the processing may be applied to each of the plurality of clusters in some embodiments.

At step S320, for each audio element in the cluster, a measure of energy that the audio element contributes to the cluster is determined (e.g., calculated). For example, the measure of energy $E_{oc}$ that the audio element o contributes to the cluster c may be given by $$E_{oc}=g_{oc}^{2}E_{o} \quad \text{(Eq. (1))}$$

where $E_o$ is the energy of the (dynamic) audio element o and $g_{oc}$ is the element-to-cluster gain (e.g., object-to-cluster gain) for the audio element o.

At step S330, a compensation gain is determined (e.g., calculated), for at least one audio element in the cluster, based at least in part on the measures of energy for the audio elements in the cluster.

At step S340, the compensation gain is applied to the at least one audio element in the cluster. Applying the compensation gain to the at least one audio element may reduce a difference in loudness between the at least one audio object when rendered to a set of loudspeakers as part(s) of the clusters and the at least one audio object when rendered directly to the set of loudspeakers.

In some embodiments, the method 300 may further include rendering the plurality of clusters of audio elements to a loudspeaker layout.

Next, examples of more specific implementations and details of method 300 will be described with reference to FIG. 4 to FIG. 11. As will become apparent from these examples, the compensation gain (e.g., determined at step S330) may comprise any of an overall compensation gain of a given cluster (which is the same for all audio elements in the given cluster), an individual compensation gain (which can be different between audio elements within a given cluster), and/or an overall compensation gain of a loudspeaker (which is the same for all audio elements that are rendered to a given loudspeaker). Any of the methods described below may be seen as an implementation of step S330 of method 300.

Figure 4:
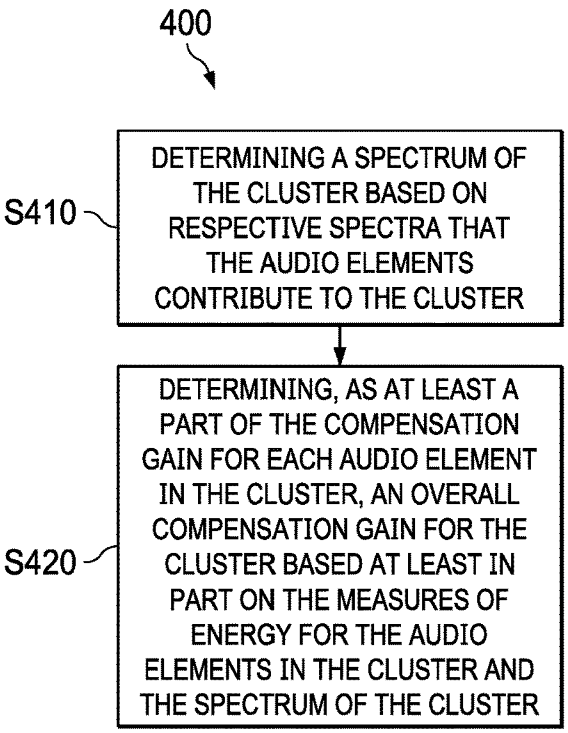
FIG. 4 to FIG. 11 are flowcharts illustrating examples of implementations of the method of FIG. 3 according to embodiments of the disclosure.
Figure 5:
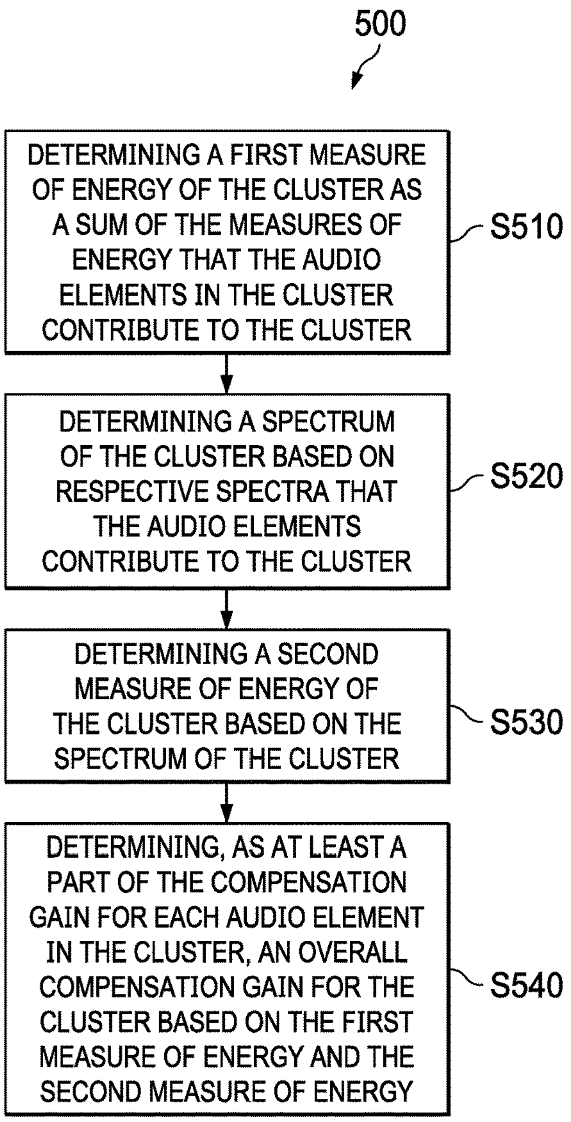

FIG. 4 and FIG. 5 illustrate methods 400 and 500, respectively, that return (and apply) an overall compensation gain for each cluster, i.e., they may be said to relate to cluster-adaptive loudness normalization.

The general idea underlying these methods is to estimate an adaptive gain for each audio element (e.g., object) in a cluster (the gain being uniform throughout the cluster) when it is rendered to the cluster. For each cluster, the total energy (total element energy (e.g., total object energy) or expected energy) is calculated that all objects rendered to the cluster contribute the cluster, then the actual energy of the cluster is calculated, and finally the compensation gain is calculated to reduce the difference between the total energy and the actual energy.

Method 400 in FIG. 4 may be seen as a high-level implementation of this general idea. Steps S410 and S420 are performed for the aforementioned cluster among the plurality of clusters. In some embodiments, they may be performed for each cluster among the plurality of clusters.

At step S410, a spectrum of the cluster is determined (e.g., calculated) based on respective spectra that the audio elements contribute to the cluster.

At step S420, an overall compensation gain for the cluster is determined (e.g., calculated), as at least a part of the compensation gain for each audio element in the cluster, based at least in part on the measures of energy for the audio elements in the cluster and the spectrum of the cluster.

Method 500 in FIG. 5 is a specific implementation of method 400. Steps S510 to S540 are performed for the aforementioned cluster among the plurality of clusters. In some embodiments, they may be performed for each cluster among the plurality of clusters.

At step S510, a first measure of energy of the cluster is determined (e.g., calculated) as a sum of the measures of energy that the audio elements in the cluster contribute to the cluster. The first measure of energy may be referred to as the total energy $E_{tot\_o}$ of the cluster, i.e., the total (object) energy that is rendered to cluster c. Then, the first measure of energy for the cluster c may be given by $$E_{tot\_o}=\sum_{o}E_{oc}=\sum_{o}g_{oc}^{2}E_{o} \quad \text{(Eq. (2))}$$

Here, index o indicates a respective audio element in the cluster c.

At step S520, a spectrum of the cluster is determined (e.g., calculated) based on respective spectra that the audio elements contribute to the cluster. The spectrum $X_c$ of the cluster may be given by $X_c=\Sigma_o g_{oc}X_o$, with $X_o$ being the spectrum of the respective (dynamic) audio element and ■* indicating the complex conjugate of ■.

At step S530, a second measure of energy of the cluster based on the spectrum of the cluster. The second measure of energy may be referred to as the actual energy $E_c$ of the cluster. Then, the second measure of energy may be given by $$E_c=X_c{}^{*}X_c \quad \text{(Eq. (3))}$$

At step S540, an overall compensation gain for the cluster is determined (e.g., calculated), as at least a part of the compensation gain for each audio element in the cluster, based on the first measure of energy and the second measure of energy. This overall compensation gain is determined to make the loudness similar before and after clustering. To this end, the overall compensation gain of the cluster may be determined as the square root of a ratio of the first measure of energy and the second measure of energy. For example, the overall compensation gain $g1_c$ of the cluster may be given by $$g1_c=\sqrt{\frac{E_{tot\_o}}{E_c}} \quad \text{(Eq. (4))}$$

Applying this compensation gain yields a total audio element gain (total audio element-to-cluster gain)

$$g_{oc}'=g_{oc}\cdot g1_c \quad \text{(Eq. (5))}$$

In general, the compensation gains (or any parts thereof) may be used on top of respective audio element gains.

Here and in the remainder of the disclosure, the compensation gain may be (dynamically) determined every frame. That is, the compensation gain may be determined for each frame or each group of frames of the audio content. Moreover, smoothing can be applied to the frame-wise (or group-wise) determined compensation gains.

Figure 6:
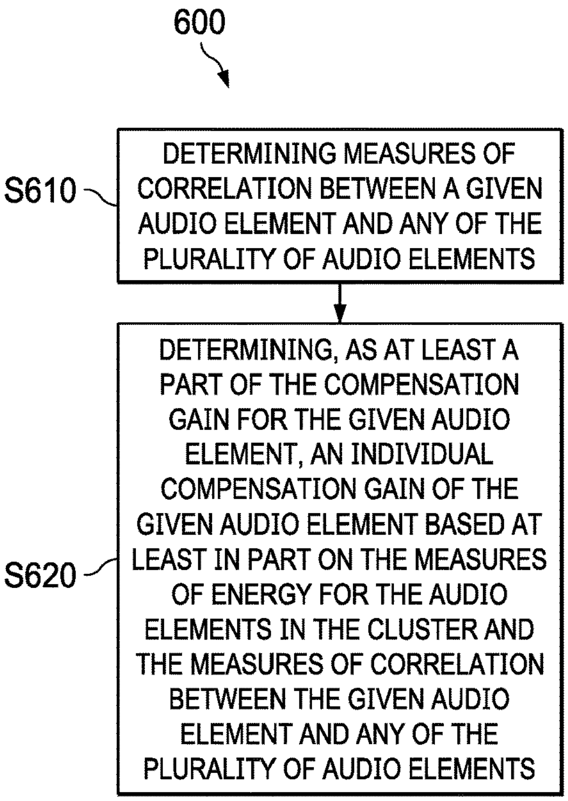
Figure 7:
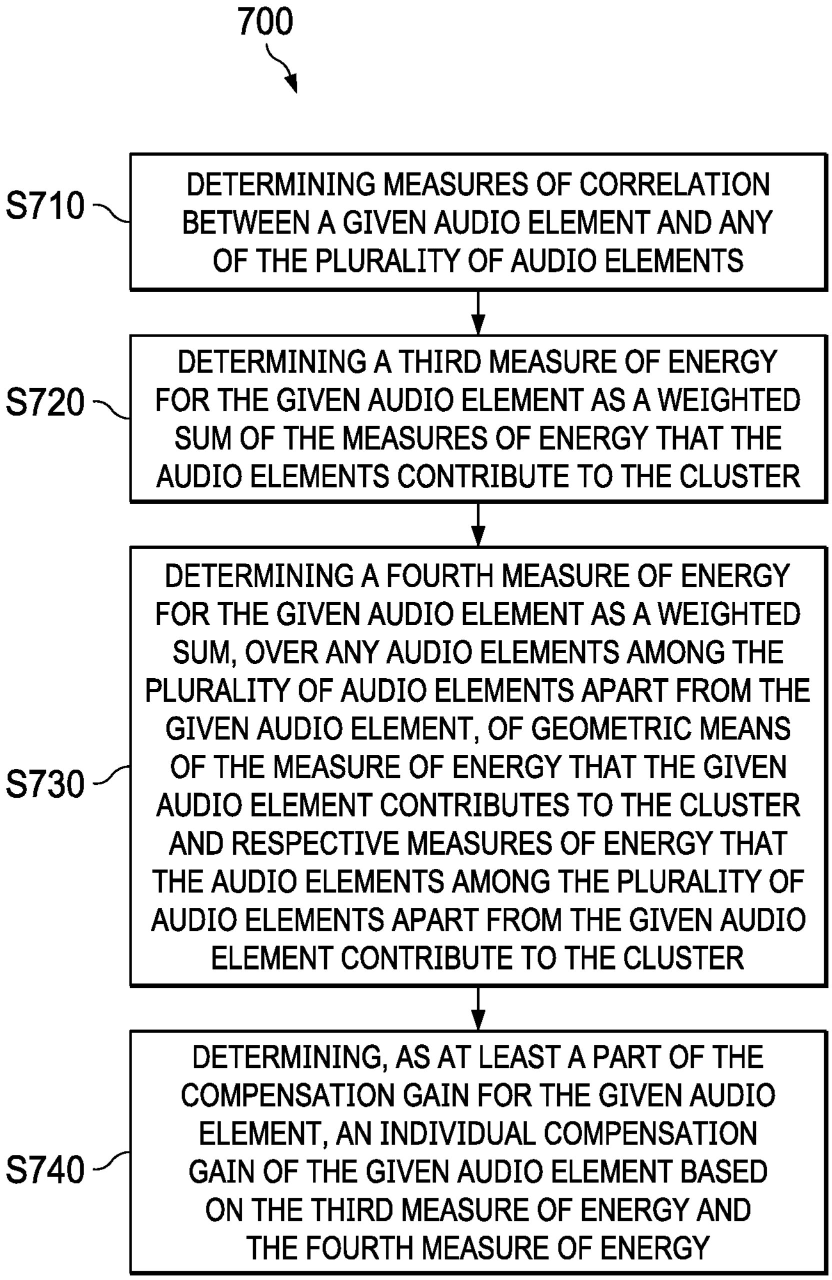

FIG. 6 and FIG. 7 illustrate methods 600 and 700, respectively, that return (and apply) correlation-dependent compensation gains to individual audio elements in the clusters, i.e., they may be said to relate to correlation-dependent element-adaptive loudness normalization.

Methods 400 and 500 estimate one gain for each cluster and apply the same gain for all the audio elements that are rendered to this cluster. Instead, methods 600 and 700 determine element-adaptive (e.g., object-adaptive) gains and apply different gains to different audio elements. The correlations between audio elements are utilized for this purpose. The general idea is the following. If an audio element is highly correlated to other audio elements, it may introduce higher loudness boost and thus applying a smaller gain may be more appropriate.

Method 600 in FIG. 6 may be seen as a high-level implementation of this general idea. Steps S610 and S620 are performed for a given audio element in the aforementioned cluster among the plurality of clusters. In some embodiments, they may be performed for each audio element in the cluster, and/or for each cluster among the plurality of clusters.

At step S610, measures of correlation between the given audio element and any of the plurality of audio elements (typically, though not necessarily in the same cluster) are determined (e.g., calculated).

At step S620, an individual compensation gain of the given audio element is determined (e.g., calculated), as at least a part of the compensation gain for the given audio element, based at least in part on the measures of energy for the audio elements in the cluster and the measures of correlation between the given audio element and any of the plurality of audio elements.

Method 700 in FIG. 7 is a specific implementation of method 600. Steps S710 to S740 are performed for the given audio element in the aforementioned cluster among the plurality of clusters. In some embodiments, they may be performed for each audio element in the cluster, and/or for each cluster among the plurality of clusters.

At step S710, measures of correlation between the given audio element and any of the plurality of audio elements are determined (e.g., calculated). The measure of correlation $r_{ou}$ between the given audio element o and any of the plurality of audio elements u may be given by $$r_{ou} = \frac{\mathrm{Re}(X_o^* X_u)}{\sqrt{E_o E_u}} \quad \text{(Eq. (6))}$$

Here, indices o and u indicate the given audio element and the one of the plurality of audio elements, respectively. $X_o$ indicates the spectrum of the given audio element, $X_u$ indicates the spectrum of the one of the plurality of audio elements, $E_o$ indicates the energy of the given audio element, and $E_u$ indicates the energy of the one of the plurality of audio elements. Re(■) indicates the real part of ■. In general, $r_{ou}$ is a measure of correlation between any two audio elements o and u.

At step S720, a third measure of energy for the given audio element is determined (e.g., calculated) as a weighted sum of the measures of energy $E_{uc}$ that the audio elements u contribute to the cluster c. Therein, the weights for the measures of energy may be based on the respective measures of correlation between the respective audio elements and the given audio element. For example, the third measure of energy $a_{oc}$ may be given by $$a_{oc} = \sum_u |r_{ou}| E_{uc} \quad \text{(Eq. (7))}$$

That is, the weights may be given by $|r_{ou}|$, i.e., they may be given by the magnitude of the respective measures of correlation between the respective audio elements and the given audio element. Here, $E_{uc}$ may be given by $E_{uc}=g_{uc}^2E_u$, where $g_{uc}$ is the element-to-cluster gain for audio element u and cluster c. The third measure of energy $a_{oc}$ may also be referred to as spread energy for the given audio element o rendered to cluster c.

At step S730, a fourth measure of energy for the given audio element is determined (e.g., calculated) as a weighted sum, over any audio elements among the plurality of audio elements apart from the given audio element, of geometric means of the measure of energy that the given audio element contributes to the cluster and respective measures of energy that the audio elements among the plurality of audio elements apart from the given audio element contribute to the cluster. Therein, the weights for the geometric means may be based on the respective measures of correlation between the respective audio elements and the given audio element. For example, he fourth measure of energy $b_{oc}$ may be given by $$b_{oc} = \sum_{u \neq o} r_{ou} \sqrt{E_{oc} E_{uc}} \quad \text{(Eq. (8))}$$

The fourth measure of energy $b_{oc}$ may also be referred to as cross-element (e.g., cross-object) energy for audio element o rendered to cluster c.

At step S740, an individual compensation gain of the given audio element is determined (e.g., calculated), as at least a part of the compensation gain for the given audio element, based on the third measure of energy and the fourth measure of energy. For example, the individual compensation gain $g1_{oc}$ may be given by $$g1_{oc} = \frac{a_{oc}}{a_{oc} + b_{oc}} \quad \text{(Eq. (9))}$$

This individual compensation gain effectively gives more attenuation to the highly-correlated objects that are a main cause of the loudness boost.

For example, in a simple example case where the correlation matrix is $$\begin{bmatrix} 1 & 1 & 0 \\ 1 & 1 & 0 \\ 0 & 0 & 1 \end{bmatrix}$$

for three audio elements (e.g., objects), the first two audio elements may receive a smaller gain (i.e., may receive more attenuation).

Additionally, after applying respective individual compensation gains $g1_{oc}$ to audio elements o in cluster c, an overall compensation gain $g1_c$ can be determined (e.g., calculated) for the cluster c to minimize the difference between the expected energy and actual energy of the cluster c, in the same manner as in methods 400 and 500, however using compensated energies $E_o$ and spectra $X_o$ (i.e., energies and spectra after application of the individual compensation gains). By successively determining the individual compensation gains $g1_{oc}$, applying the individual compensation gains $g1_{oc}$, and determining the overall compensation gain $g1_c$ for the cluster c, a compensation gain $g1_{oc}'$ can be determined for each audio element o in the cluster c via $$g1_{oc}'=g1_{oc}*g1_c \quad \text{(Eq. (10))}$$

This implies an overall element-to-cluster gain $g_{oc}'$ given by $$g_{oc}'=g_{oc}*g1_{oc}' \quad \text{(Eq. (11))}$$

Figure 8:
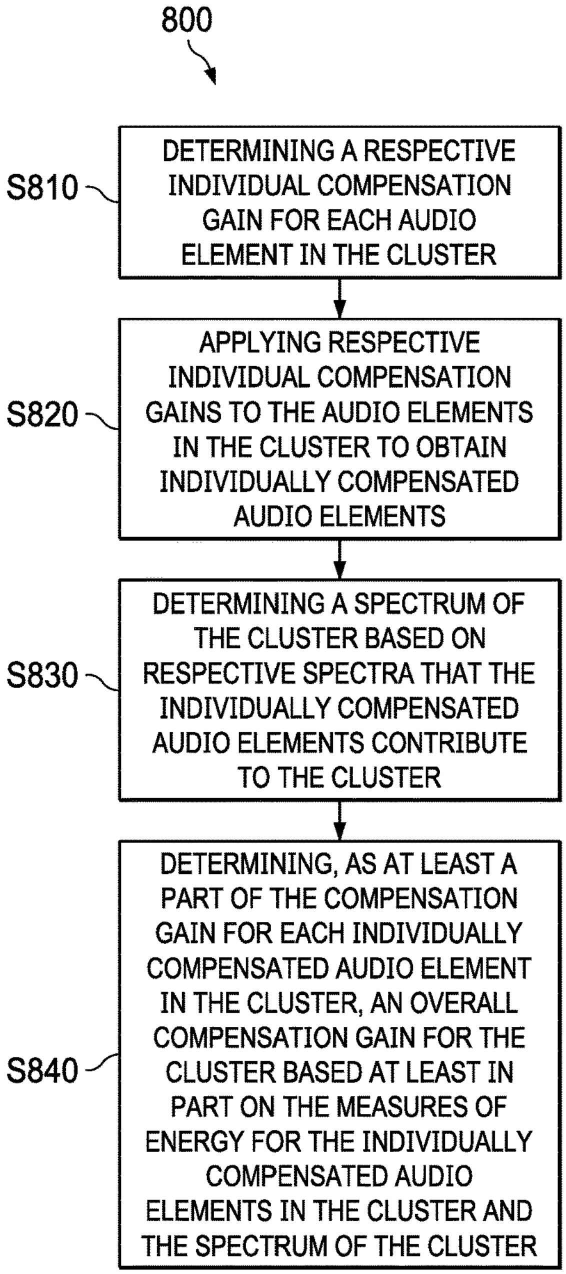
Figure 9:
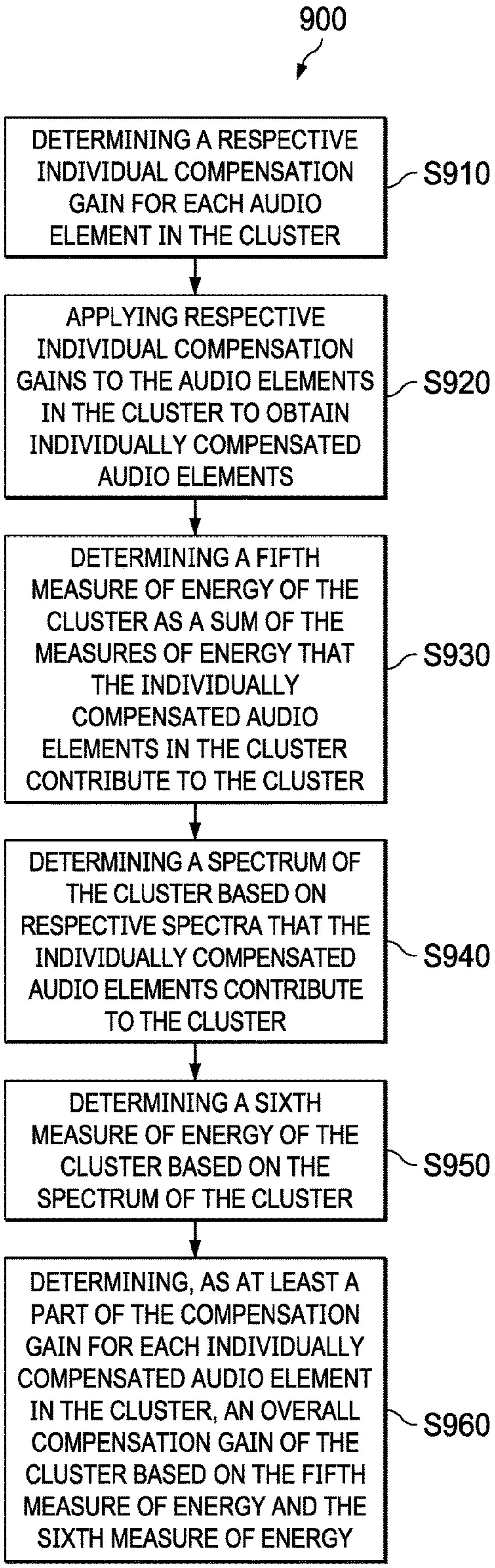

FIG. 8 and FIG. 9 illustrate methods 800 and 900, respectively, that return (and apply) compensation gains as indicated above, wherein this compensation gain is determined after individual compensation gains have been applied to the audio elements in a given cluster. That is, methods 800 and 900 may be said to relate to correlation-dependent element-adaptive and cluster-adaptive loudness normalization.

Method 800 in FIG. 8 may be seen as is a high-level implementation of the determination of the aforementioned overall gains $g1_{oc}'$. Steps S810 to S840 are performed for the aforementioned cluster among the plurality of clusters. In some embodiments, they may be performed for each cluster among the plurality of clusters.

At step S810, a respective individual compensation gain is determined (e.g., calculated) for each audio element in the cluster. This may proceed by way of methods 600 or 700, for example.

At step S820, respective individual compensation gains are applied to the audio elements in the cluster to obtain individually compensated audio elements.

At step S830, a spectrum of the cluster is determined (e.g., calculated) based on respective spectra that the individually compensated audio elements contribute to the cluster.

At step S840, an overall compensation gain for the cluster is determined (e.g., calculated), as at least a part of the compensation gain for each individually compensated audio element in the cluster, based at least in part on the measures of energy for the individually compensated audio elements in the cluster and the spectrum of the cluster.

In general, method 800 may be said to correspond to successive performing methods 400/500 to a cluster after individual compensation gains as per methods 600/700 have been applied to the audio elements in the cluster.

Method 900 in FIG. 9 is a specific implementation of method 800. Steps S910 to S960 are performed for the aforementioned cluster among the plurality of clusters. In some embodiments, they may be performed for each cluster among the plurality of clusters.

At step S910, a respective individual compensation gain is determined (e.g., calculated) for each audio element in the cluster. This may proceed by way of methods 600 or 700, for example.

At step S920, respective individual compensation gains are applied to the audio elements in the cluster to obtain individually compensated audio elements.

At step S930, a fifth measure of energy of the cluster is determined (e.g., calculated) as a sum of the measures of energy that the individually compensated audio elements in the cluster contribute to the cluster. The fifth measure of energy may correspond to the first measure of energy described above, with the difference that the individually compensated audio elements are considered (instead of the initial, uncompensated audio elements). Accordingly, this may proceed in analogy to step S510 described above.

At step S940, a spectrum of the cluster is determined (e.g., calculated) based on respective spectra that the individually compensated audio elements contribute to the cluster. This may proceed in analogy to step S520 described above.

At step S950, a sixth measure of energy of the cluster is determined (e.g., calculated) based on the spectrum of the cluster. The sixth measure of energy may correspond to the second measure of energy, with the difference that the individually compensated audio elements are considered (instead of the initial, uncompensated audio elements). Accordingly, this may proceed in analogy to step S530 described above.

Finally, at step S960, an overall compensation gain of the cluster is determined (e.g., calculated), as at least a part of the compensation gain for each individually compensated audio element in the cluster, based on the fifth measure of energy and the sixth measure of energy. This may proceed in analogy to step S540 described above.

Figure 10:
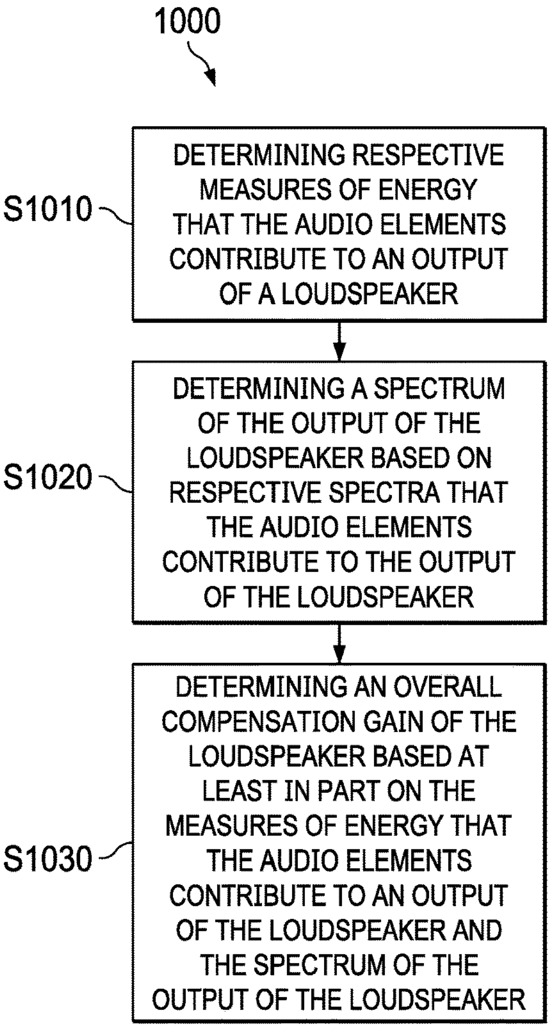
Figure 11:
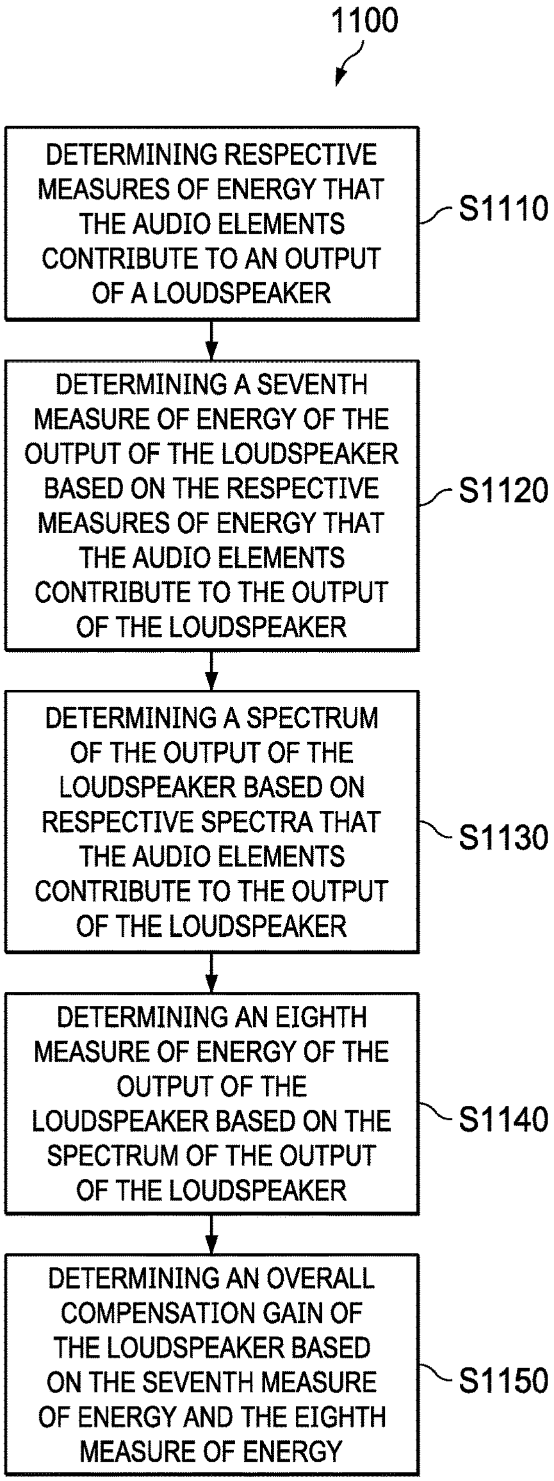

FIG. 10 and FIG. 11 illustrate methods 1000 and 1100, respectively, that return (and apply) an overall compensation gain for each loudspeaker of a (target) speaker layout to which the clusters are rendered, i.e., they may be said to relate to speaker-adaptive loudness normalization. The resulting speaker-adaptive gain can be applied on top of the gains determined by methods 400 to 900 described above.

The general idea is that in the case where the playback speaker layout is known, the target speaker layout can be used to estimate the appropriate gains to further minimize the potential loudness boost.

Method 1000 in FIG. 10 may be seen as a high-level implementation of the determination of the speaker-specific overall compensation gains. Steps S1010 to S1030 are performed for a loudspeaker to which at least one of the plurality of clusters is rendered. In some embodiments, they may be performed for each loudspeaker to which at least one of the plurality of clusters is rendered. The audio elements in this method may be original/initial audio elements or audio elements compensated by any of the aforementioned compensation gains (e.g., individually compensated audio elements, etc.).

At step S1010, respective measures of energy that the audio elements contribute to an output (e.g., output signal, speaker channel signal) of the loudspeaker are determined (e.g., calculated).

At step S1020, a spectrum of the output of the loudspeaker is determined (e.g., calculated) based on respective spectra that the audio elements contribute to the output of the loudspeaker.

At step S1030, an overall compensation gain of the loudspeaker is determined (e.g., calculated) based at least in part on the measures of energy that the audio elements contribute to an output of the loudspeaker and the spectrum of the output of the loudspeaker.

Method 1100 in FIG. 11 is a specific implementation of method 1000. The method involves computing the total element energy (e.g., object energy) that is rendered to a given speaker channel, and compute the actual spectrum and actual energy of the signal that the speaker channel receives/forms. The speaker-dependent compensation gain can then be computed accordingly.

Steps S1110 to S1150 are performed for a loudspeaker to which at least one of the plurality of clusters is rendered. In some embodiments, they may be performed for each loudspeaker to which at least one of the plurality of clusters is rendered. The audio elements in this method may be original/initial audio elements or audio elements compensated by any of the aforementioned compensation gains (e.g., individually compensated audio elements, etc.).

At step S1110, respective measures of energy that the audio elements contribute to an output (e.g., output signal, speaker channel signal) of the loudspeaker are determined (e.g., calculated).

At step S1120, a seventh measure of energy of the output of the loudspeaker is determined (e.g., calculated) based on the respective measures of energy that the audio elements contribute to the output of the loudspeaker. The seventh measure of energy may be referred to as the total element energy (e.g., object energy) that is supposed to be rendered by the speaker (speaker channel) s. For example, the seventh measure of energy may be given by $$E_{elem \to spk} = \sum_{o=1}^{N} g_{os}^2 E_o$$

with the element-to-speaker gain $g_{os}$ for audio element o among the plurality of audio elements and the loudspeaker s (i.e., the portion of audio element o that is rendered to speaker (speaker channel) s.

At step S1130, a spectrum of the output of the loudspeaker is determined (e.g., calculated) based on respective spectra that the audio elements contribute to the output of the loudspeaker. The spectrum $X_{cls \to spk}$ of the output of the loudspeaker s may be referred to as the actual signal that the speaker (speaker channel) s receives. It may be given by $$X_{cls \to spk} = \sum_{c} \sum_{o} g_{cs} g_{oc} X_o \qquad \text{(Eq. (13))}$$

with index c indicating the clusters, $X_o$ indicating the spectrum of a given audio element o, $g_{cs}$ being the cluster-to-speaker gain for cluster c and the loudspeaker s, and $g_{oc}$ being the element-to-cluster gain for cluster c and audio element o in the cluster. As such, the spectrum $X_{cls \to spk}$ of the output of the loudspeaker s may be generated from two steps. At the first step, audio elements (e.g., objects) are clustered (e.g., rendered) to clusters, and at the second step, clusters are rendered to speakers.

At step S1140, an eighth measure of energy of the output of the loudspeaker is determined (e.g., calculated) based on the spectrum of the output of the loudspeaker. The eighth measure of energy may be referred to as the (actual) energy in the speaker (speaker channel). It may be given by $$E_{cls \to spk} = X_{cls \to spk} X_{cls \to spk} \qquad \text{(Eq. (14))}$$

At step S1150, an overall compensation gain of the loudspeaker is determined (e.g., calculated) based on the seventh measure of energy and the eighth measure of energy. The overall compensation gain of the loudspeaker may be determined as the square root of a ratio of the seventh measure of energy and the eighth measure of energy. For example, the overall compensation gain $g2_{oc}$ of the loudspeaker may be given by $$g2_{oc} = \sqrt{\frac{E_{elem \to spk}}{E_{cls \to spk}}}$$

As noted above, the overall compensation gain $g2_{oc}$ can be combined with any of the compensation gains obtained in methods 400/500, 600/700, or 800/900, and applied on top of the original element-to-cluster gain. That is, the resulting element-to-cluster gain may be given by $$g_{oc}' = g_{oc} * g1_c * g2_{oc} \qquad \text{(Eq. (16))}$$

or $$g_{oc}' = g_{oc} * g1_{oc}^{(')} * g2_{oc} \qquad \text{(Eq. (17))}$$

To make any of the compensation gains described above more stable and less disruptive, a compressor (e.g., dynamic range compressor, limiter) can be applied to the obtained compensation gains. For example, the minimum and maximum value of the compensation gains can be limited. Thus, methods according to embodiments of the disclosure (e.g., methods 300, 400/500, 600/700, 800/900, or 1000/1100) may comprise applying a dynamic range compressor or limiter to the determined compensation gain(s) before applying the compensation gain(s) to respective audio elements. For example, the gain values can be limited to the range (0.25, 4), that is in [−6 dB, 6 dB] in decibel domain.

In some embodiments, a relax parameter can be added. If the difference between the expected energy (first or fifth measure of energy) and the actual energy (second or sixth measure of energy) of a cluster is less than a tolerance threshold, say, e.g., 1 dB, the difference can be accepted and the overall compensation gain for that cluster can be set to 1 (unity). In this case, the overall compensation gain for the cluster is applied only when the difference is large.

In general, methods according to embodiments of the disclosure (e.g., methods 300, 400/500, 600/700, 800/900, or 1000/1100) may further comprise setting the compensation gain to unity depending on whether a difference between an expected energy and an actual energy of the respective cluster is smaller than a predetermined threshold for the difference. That is, the compensation gain may be set to unity (i.e., no additional compensation) if the difference is smaller than the predetermined threshold.

Further, in some embodiments according to the disclosure, extensional operations may be applied that can alleviate the loudness boost.

A first extension operation relates to increasing a decorrelation amount on the size objects. Conventionally, when size objects are prebaked to internal beds, the beds are conservatively decorrelated in order to keep timbre and naturalness of the sound. However, this may increase the possibility of loudness boosts since the correlated signal may acoustically sum up in a cluster. Increasing the decorrelation amount may reduce the loudness boost (although possibly at the cost of timbre change).

Accordingly, methods according to embodiments of the disclosure (e.g., methods 300, 400/500, 600/700, 800/900, or 1000/1100) may further comprise increasing a decorrelation between audio elements among the plurality of audio elements that have a spatial size in excess of a predetermined threshold for the size. Additional decorrelation may be particularly applied to internal bed channels (i.e., to audio elements that correspond to internal bed channels).

A second extension operation relates to sub-band gain estimation. While the gains estimated/determined by the above methods (e.g., methods 300, 400/500, 600/700, 800/900, or 1000/1100) are wide-band gains (i.e., the same gain is applied to all the frequency bins) it may be useful to estimate gains from sub-bands (e.g., divided based on ERB rate). The reason is that different sub-bands may play different roles perceptually and sub-band-specific methods may provide higher frequency resolution to estimate loudness difference and object correlation.

Accordingly, in methods according to embodiments of the disclosure (e.g., methods 300, 400/500, 600/700, 800/900, or 1000/1100) the compensation gain may be determined in each of a plurality of frequency subbands.

A third extension operation relates to loudness domain gain estimation. While some of the above methods estimate gains in the energy domain (which is related to loudness), gains may be estimated/determined in the loudness domain to address the loudness boost problem in a more direct way. Computing loudness from the spectrum of an object is well-known. It would then be straightforward to compute respective loudness gains, by simply replacing the energy such as $E_o$ and $E_c$ by loudness $L_o$ and $L_c$.

Accordingly, in methods according to embodiments of the disclosure (e.g., methods 300, 400/500, 600/700, 800/900, or 1000/1100) the measures of energy may be measures of loudness.

The present disclosure further relates to apparatus comprising a processor and a memory coupled to the processor and storing instructions for execution by the processor. The processor may be configured to perform the steps of any of the methods described above. Any statements made above with regard to the methods according to embodiments of the disclosure are understood to likewise apply to these apparatus.

The present disclosure further relates to computer programs including instructions for causing a processor that carries out the instructions to perform the steps of any of the methods described above. Any statements made above with regard to the methods according to embodiments of the disclosure are understood to likewise apply to these computer programs.

The present disclosure yet further relates to computer-readable storage media storing the aforementioned computer programs. Any statements made above with regard to the methods according to embodiments of the disclosure are understood to likewise apply to these computer-readable storage media.

As has been verified by simulations and listening tests, cluster-adaptive loudness normalization can greatly alleviate the loudness boost, and adding target speaker layout dependent loudness normalization can further improve the clustering quality.

Various aspects and implementations of the present invention may be appreciated from the following enumerated example embodiments (EEEs), which are not claims.

EEE1 relates to a method of processing audio content including a plurality of audio elements, the method comprising: clustering the plurality of audio elements into a plurality of clusters of audio elements; and for a cluster among the plurality of clusters: for each audio element in the cluster, determining a measure of energy that the audio element contributes to the cluster; for at least one audio element in the cluster, determining a compensation gain based at least in part on the measures of energy for the audio elements in the cluster; and applying the compensation gain to the at least one audio element in the cluster.

EEE2 relates to a method according to EEE1, wherein the measure of energy that an audio element contributes to the cluster c is given by $E_{oc}=g_{oc}^2E_o$, where $E_o$ is the energy of the audio element and $g_{oc}$ is the element-to-cluster gain for the audio element o.

EEE3 relates to a method according to EEE1 or EEE2, comprising, for the cluster among the plurality of clusters: determining a spectrum of the cluster based on respective spectra that the audio elements contribute to the cluster; and determining, as at least a part of the compensation gain for each audio element in the cluster, an overall compensation gain for the cluster based at least in part on the measures of energy for the audio elements in the cluster and the spectrum of the cluster.

EEE4 relates to a method according to EEE1 or EEE2, comprising, for the cluster among the plurality of clusters: determining a first measure of energy of the cluster as a sum of the measures of energy that the audio elements in the cluster contribute to the cluster; determining a spectrum of the cluster based on respective spectra that the audio elements contribute to the cluster; determining a second measure of energy of the cluster based on the spectrum of the cluster; and determining, as at least a part of the compensation gain for each audio element in the cluster, an overall compensation gain for the cluster based on the first measure of energy and the second measure of energy.

EEE5 relates to a method according to EEE4 when including the features of EEE2, wherein the first measure of energy for the cluster is given by $E_{tot\_o}=\Sigma_oE_{oc}$, and/or wherein the second measure of energy is given by $E_c=X_c{}^*X_c$, where index o indicates a respective audio element in the cluster, with $X_c=g_{oc}X_o$ being the spectrum of the cluster, $X_o$ being the spectrum of the respective audio element, and ■* indicating the complex conjugate of ■.

EEE6 relates to a method according to EEE4 or EEE5, wherein the overall compensation gain of the cluster is determined as the square root of a ratio of the first measure of energy and the second measure of energy.

EEE7 relates to a method according to EEE1 or EEE2, comprising, for a given audio element in the cluster among the plurality of clusters: determining measures of correlation between the given audio element and any of the plurality of audio elements; and determining, as at least a part of the compensation gain for the given audio element, an individual compensation gain of the given audio element based at least in part on the measures of energy for the audio elements in the cluster and the measures of correlation between the given audio element and any of the plurality of audio elements.

EEE8 relates to a method according to EEE1 or EEE2, comprising, for a given audio element in the cluster among the plurality of clusters: determining measures of correlation between the given audio element and any of the plurality of audio elements; determining a third measure of energy for the given audio element as a weighted sum of the measures of energy that the audio elements contribute to the cluster, wherein the weights for the measures of energy are based on the respective measures of correlation between the respective audio elements and the given audio element; determining a fourth measure of energy for the given audio element as a weighted sum, over any audio elements among the plurality of audio elements apart from the given audio element, of geometric means of the measure of energy that the given audio element contributes to the cluster and respective measures of energy that the audio elements among the plurality of audio elements apart from the given audio element contribute to the cluster, wherein the weights for the geometric means are based on the respective measures of correlation between the respective audio elements and the given audio element; and determining, as at least a part of the compensation gain for the given audio element, an individual compensation gain of the given audio element based on the third measure of energy and the fourth measure of energy.

EEE9 relates to a method according to EEE8 when including the features of EEE2, wherein the measure of correlation between the given audio element and any of the plurality of audio elements is given by $$r_{ou} = \frac{\mathrm{Re}(X_o^* X_u)}{\sqrt{E_o E_u}},$$

where indices o and u indicate the given audio element and the one of the plurality of audio elements, respectively, with $X_o$ being the spectrum of the given audio element, $X_u$ being the spectrum of the one of the plurality of audio elements, $E_o$ being the energy of the given audio element, and $E_u$ being the energy of the one of the plurality of audio elements; wherein the third measure of energy is given by $a_{oc}=\Sigma_u|r_{ou}|E_o$, and/or wherein the fourth measure of energy is given by $b_{oc}=\Sigma_{u\neq o}r_{ou}\sqrt{E_{oc}E_{uc}}$.

EEE10 relates to a method according to EEE9, wherein the individual compensation gain is given by $$g1_{oc} = \frac{a_{oc}}{a_{oc} + b_{oc}}.$$

EEE11 relates to a method according to any one of EEE7 to EEE10, comprising, for the cluster among the plurality of clusters: determining a respective individual compensation gain for each audio element in the cluster; applying respective individual compensation gains to the audio elements in the cluster to obtain individually compensated audio elements; determining a spectrum of the cluster based on respective spectra that the individually compensated audio elements contribute to the cluster; and determining, as at least a part of the compensation gain for each individually compensated audio element in the cluster, an overall compensation gain for the cluster based at least in part on the measures of energy for the individually compensated audio elements in the cluster and the spectrum of the cluster.

EEE12 relates to a method according to any one of EEE7 to EEE10, comprising, for the cluster among the plurality of clusters: determining a respective individual compensation gain for each audio element in the cluster; applying respective individual compensation gains to the audio elements in the cluster to obtain individually compensated audio elements; determining a fifth measure of energy of the cluster as a sum of the measures of energy that the individually compensated audio elements in the cluster contribute to the cluster; determining a spectrum of the cluster based on respective spectra that the individually compensated audio elements contribute to the cluster; determining a sixth measure of energy of the cluster based on the spectrum of the cluster; and determining, as at least a part of the compensation gain for each individually compensated audio element in the cluster, an overall compensation gain of the cluster based on the fifth measure of energy and the sixth measure of energy.

EEE13 relates to a method according to any one of EEE1 to EEE12, further comprising, for a loudspeaker to which at least one of the clusters is rendered: determining respective measures of energy that the audio elements contribute to an output of the loudspeaker; determining a spectrum of the output of the loudspeaker based on respective spectra that the audio elements contribute to the output of the loudspeaker; and determining an overall compensation gain of the loudspeaker based at least in part on the measures of energy that the audio elements contribute to an output of the loudspeaker and the spectrum of the output of the loudspeaker.

EEE14 relates to a method according to any one of EEE1 to EEE12, further comprising, for a loudspeaker to which at least one of the clusters is rendered: determining respective measures of energy that the audio elements contribute to an output of the loudspeaker; determining a seventh measure of energy of the output of the loudspeaker based on the respective measures of energy that the audio elements contribute to the output of the loudspeaker; determining a spectrum of the output of the loudspeaker based on respective spectra that the audio elements contribute to the output of the loudspeaker; determining an eighth measure of energy of the output of the loudspeaker based on the spectrum of the output of the loudspeaker; and determining an overall compensation gain of the loudspeaker based on the seventh measure of energy and the eights measure of energy.

EEE15 relates to a method according to EEE14, wherein the seventh measure of energy is given by $E_{elem\rightarrow spk}=\Sigma_{o=1}^{N}g_{os}^{2}E_o$, with the element-to-speaker gain $g_{os}$ for audio element o among the plurality of audio elements and the loudspeaker s; wherein the spectrum of the output of the loudspeaker is given by $X_{cls\rightarrow spk}=\Sigma_c\Sigma_o\, g_{cs}\cdot g_{oc}X_o$, with Index c Indicating the clusters, $X_o$ indicating the spectrum of a given audio element o, $g_{cs}$ being the cluster-to-speaker gain for cluster c and the loudspeaker s, and $g_{oc}$ being the element-to-cluster gain for cluster c and audio element o in the cluster; and/or wherein the eighth measure of energy is given by $E_{cls\rightarrow spk}=X_{cls\rightarrow spk}^{*}X_{cls\rightarrow spk}$.

EEE16 relates to a method according to EEE14 or EEE15, wherein the overall compensation gain of the loudspeaker is determined as the square root of a ratio of the seventh measure of energy and the eighth measure of energy.

EEE17 relates to a method according to any one of EEE1 to EEE16, wherein the compensation gain is determined for each frame or each group of frames of the audio content.

EEE18 relates to a method according to any one of EEE1 to EEE17, wherein clustering the plurality of audio elements into the plurality of clusters comprises: clustering the plurality of audio elements into a plurality of intermediate clusters; and clustering the plurality of intermediate clusters into the plurality of clusters.

EEE19 relates to a method according to any one of EEE1 to EEE18, further comprising: applying a dynamic range compressor or limiter to the determined compensation gain before applying the compensation gain to a respective audio element.

EEE20 relates to a method according to any one of EEE1 to EEE19, further comprising: setting the compensation gain to unity depending on whether a difference between an expected energy and an actual energy of the respective cluster is smaller than a predetermined threshold for the difference.

EEE21 relates to a method according to any one of EEE1 to EEE20, further comprising: increasing a decorrelation between audio elements among the plurality of audio elements that have a spatial size in excess of a predetermined threshold for the size.

EEE22 relates to a method according to any one of EEE1 to EEE21, wherein the compensation gain is determined in each of a plurality of frequency subbands.

EEE23 relates to a method according to any one of EEE1 to EEE22, wherein the measure of energy is a measure of loudness.

EEE24 relates to an apparatus comprising a processor and a memory coupled to the processor and storing instructions for execution by the processor, wherein the processor is configured to perform the method steps of a method according to any one of EEE1 to EEE23.

EEE25 relates to a computer program including instructions that, when executed by a processor, cause the processor to perform the method of processing audio content according to any one of EEE1 to EEE23.

EEE26 relates to a computer-readable medium storing a computer program according to EEE25.

The invention claimed is:

1. A method of processing audio content including a plurality of audio elements, the method comprising:

clustering the plurality of audio elements into a plurality of clusters of audio elements; and for a cluster among the plurality of clusters:

for each audio element in the cluster, determining a measure of energy that the audio element contributes to the cluster;

for at least one audio element in the cluster, determining a compensation gain based at least in part on the measures of energy for the audio elements in the cluster;

applying the compensation gain to the at least one audio element in the cluster, wherein the measure of energy that an audio element contributes to the cluster c is given by $E_{oc}=g_{oc}^2E_o$, where $E_o$ is the energy of the audio element and $g_{oc}$ is the element-to-cluster gain for the audio element o, wherein the element-to-cluster gain is the gain with which the audio element o is rendered to the cluster c;

for the cluster among the plurality of clusters:

determining a first measure of energy of the cluster as a sum of the measures of energy that the audio elements in the cluster contribute to the cluster;

determining a spectrum of the cluster based on respective spectra that the audio elements contribute to the cluster;

determining a second measure of energy of the cluster based on the spectrum of the cluster; and determining, as at least a part of the compensation gain for each audio element in the cluster, an overall compensation gain for the cluster based on the first measure of energy and the second measure of energy; and wherein the first measure of energy for the cluster is given by $$E_{tot\_o}=\Sigma_o E_{oc},$$

and/or wherein the second measure of energy is given by $$E_c=X_c'X_c,$$

where index o indicates a respective audio element in the cluster, with $X_c=\Sigma_o g_{oc}X_o$ being the spectrum of the cluster, $X_o$ being the spectrum of the respective audio element, and $X_c'$ indicating the complex conjugate of $X_c$.

2. The method according to claim 1, comprising, for the cluster among the plurality of clusters:

determining a spectrum of the cluster based on respective spectra that the audio elements contribute to the cluster; and determining, as at least a part of the compensation gain for each audio element in the cluster, an overall compensation gain for the cluster based at least in part on the measures of energy for the audio elements in the cluster and the spectrum of the cluster.

3. The method according to claim 1, wherein the overall compensation gain of the cluster is determined as the square root of a ratio of the first measure of energy and the second measure of energy.

4. The method according to claim 1, comprising, for a given audio element in the cluster among the plurality of clusters:

determining measures of correlation between the given audio element and any of the plurality of audio elements; and determining, as at least a part of the compensation gain for the given audio element, an individual compensation gain of the given audio element based at least in part on the measures of energy for the audio elements in the cluster and the measures of correlation between the given audio element and any of the plurality of audio elements.

5. The method according to claim 1, comprising, for a given audio element in the cluster among the plurality of clusters:

determining measures of correlation between the given audio element and any of the plurality of audio elements;

determining a third measure of energy for the given audio element as a weighted sum of the measures of energy that the audio elements contribute to the cluster, wherein the weights for the measures of energy are based on the respective measures of correlation between the respective audio elements and the given audio element;

determining a fourth measure of energy for the given audio element as a weighted sum, over any audio elements among the plurality of audio elements apart from the given audio element, of geometric means of the measure of energy that the given audio element contributes to the cluster and respective measures of energy that the audio elements among the plurality of audio elements apart from the given audio element contribute to the cluster, wherein the weights for the geometric means are based on the respective measures of correlation between the respective audio elements and the given audio element; and determining, as at least a part of the compensation gain for the given audio element, an individual compensation gain of the given audio element based on the third measure of energy and the fourth measure of energy.

6. The method according to claim 4, wherein the individual compensation gain of the given audio element is determined such that larger measures of correlation between the given audio element and any of the plurality of audio elements result in a smaller individual compensation gain for the given audio element.

7. The method according to claim 5, wherein the measure of correlation between the given audio element and any of the plurality of audio elements is given by $$r_{ou} = \frac{\mathrm{Re}(X_o^* X_u)}{\sqrt{E_o E_u}},$$

where indices o and u indicate the given audio element and the one of the plurality of audio elements, respectively, with $X_o$ being the spectrum of the given audio element, $X_u$ being the spectrum of the one of the plurality of audio elements, $E_o$ being the energy of the given audio element, and $E_u$ being the energy of the one of the plurality of audio elements; wherein the third measure of energy is given by $$a_{oc} = \Sigma_u |r_{ou}| E_o,$$

and/or wherein the fourth measure of energy is given by $$b_{oc} = \Sigma_{o \neq u} r_{ou} \sqrt{E_{oc} E_{uc}}.$$

8. The method according to claim 7, wherein the individual compensation gain is given by $$g1_{oc} = \frac{a_{oc}}{a_{oc} + b_{oc}}.$$

9. The method according to claim 4, comprising, for the cluster among the plurality of clusters:

determining a respective individual compensation gain for each audio element in the cluster;

applying respective individual compensation gains to the audio elements in the cluster to obtain individually compensated audio elements;

determining a spectrum of the cluster based on respective spectra that the individually compensated audio elements contribute to the cluster; and determining, as at least a part of the compensation gain for each individually compensated audio element in the cluster, an overall compensation gain for the cluster based at least in part on the measures of energy for the individually compensated audio elements in the cluster and the spectrum of the cluster.

10. The method according to claim 4, comprising, for the cluster among the plurality of clusters:

determining a respective individual compensation gain for each audio element in the cluster;

applying respective individual compensation gains to the audio elements in the cluster to obtain individually compensated audio elements;

determining a fifth measure of energy of the cluster as a sum of the measures of energy that the individually compensated audio elements in the cluster contribute to the cluster;

determining a spectrum of the cluster based on respective spectra that the individually compensated audio elements contribute to the cluster;

determining a sixth measure of energy of the cluster based on the spectrum of the cluster; and determining, as at least a part of the compensation gain for each individually compensated audio element in the cluster, an overall compensation gain of the cluster based on the fifth measure of energy and the sixth measure of energy.

11. The method according to claim 1, further comprising, for a loudspeaker to which at least one of the clusters is rendered:

determining respective measures of energy that the audio elements contribute to an output of the loudspeaker;

determining a spectrum of the output of the loudspeaker based on respective spectra that the audio elements contribute to the output of the loudspeaker; and determining an overall compensation gain of the loudspeaker based at least in part on the measures of energy that the audio elements contribute to the output of the loudspeaker and the spectrum of the output of the loudspeaker.

12. The method according to claim 1, further comprising, for a loudspeaker to which at least one of the clusters is rendered:

determining respective measures of energy that the audio elements contribute to an output of the loudspeaker;

determining a seventh measure of energy of the output of the loudspeaker based on the respective measures of energy that the audio elements contribute to the output of the loudspeaker;

determining a spectrum of the output of the loudspeaker based on respective spectra that the audio elements contribute to the output of the loudspeaker;

determining an eighth measure of energy of the output of the loudspeaker based on the spectrum of the output of the loudspeaker; and determining an overall compensation gain of the loudspeaker based on the seventh measure of energy and the eighth measure of energy.

13. The method according to claim 12, wherein the seventh measure of energy is given by $$E_{elem \rightarrow spk} = \Sigma_{o=1}^{N} g_{os}^2 E_o,$$

with the element-to-speaker gain $g_{os}$ for audio element o among the plurality of audio elements and the loudspeaker s; wherein the spectrum of the output of the loudspeaker is given by $$X_{cls \rightarrow spk} = \Sigma_c \Sigma_o g_{cs} g_{oc} X_o,$$

with index c indicating the clusters, $X_o$ indicating the spectrum of a given audio element o, $g_{cs}$ being the cluster-to-speaker gain for cluster c and the loudspeaker s, and $g_{oc}$ being the element-to-cluster gain for cluster c and audio element o in the cluster; and/or wherein the eighth measure of energy is given by $$E_{cls \rightarrow spk} = X_{cls \rightarrow spk}^* X_{cls \rightarrow spk}.$$

14. The method according to claim 12, wherein the overall compensation gain of the loudspeaker is determined as the square root of a ratio of the seventh measure of energy and the eighth measure of energy.

15. The method according to claim 1, wherein the compensation gain is determined for each frame or each group of frames of the audio content.

16. The method according to claim 1, wherein clustering the plurality of audio elements into the plurality of clusters comprises: clustering the plurality of audio elements into a plurality of intermediate clusters; and clustering the plurality of intermediate clusters into the plurality of clusters.

17. The method according to claim 1, further comprising:

applying a dynamic range compressor or limiter to the determined compensation gain before applying the compensation gain to a respective audio element.

18. The method according to claim 1, further comprising: setting the compensation gain to unity depending on whether a difference between an expected energy and an actual energy of the respective cluster is smaller than a predetermined threshold for the difference.

19. The method according to claim 1, further comprising: increasing a decorrelation between audio elements among the plurality of audio elements that have a spatial size in excess of a predetermined threshold for the size.

20. The method according to claim 1, wherein the compensation gain is determined in each of a plurality of frequency subbands.

21. The method according to claim 1, wherein the measure of energy is a measure of loudness.

22. An apparatus comprising a processor and a memory coupled to the processor and storing instructions for execution by the processor, wherein the processor is configured to perform the method steps of the method according to claim 1.

23. A computer program comprising a non-transitory computer-readable medium including instructions stored thereon that, when executed by a processor, cause the processor to perform the method of processing audio content according to claim 1.

24. A non-transitory computer-readable medium storing instructions that, when executed by one or more processors, cause the one or more processors to perform the method according to claim 1.

* * * * *